(12) United States Patent
Lin et al.

(10) Patent No.: US 7,012,388 B2
(45) Date of Patent: Mar. 14, 2006

(54) METHOD AND CIRCUIT FOR DRIVING A DC MOTOR

(75) Inventors: Yi-Pin Lin, Hsinchu (TW); Ray Ku, Hsinchu (TW)

(73) Assignee: Ampson Technology. INC, Hsinchu (TW)

( * ) Notice: Subject to any disclaimer, the term of this patent is extended or adjusted under 35 U.S.C. 154(b) by 0 days.

(21) Appl. No.: 10/862,969

(22) Filed: Jun. 7, 2004

(65) Prior Publication Data

US 2005/0046364 A1 Mar. 3, 2005

(30) Foreign Application Priority Data

Sep. 3, 2003 (TW) .............................. 92124385 A

(51) Int. Cl.
*H02O 1/18* (2006.01)
*H02O 3/08* (2006.01)
*H02O 5/06* (2006.01)
*H02K 23/00* (2006.01)

(52) U.S. Cl. ...................... 318/254; 318/138; 318/432; 318/439; 318/900

(58) Field of Classification Search ................ 318/254, 318/138, 439, 432, 900, 903
See application file for complete search history.

(56) References Cited

U.S. PATENT DOCUMENTS

| | | | | | |
|---|---|---|---|---|---|
| 5,537,015 A | * | 7/1996 | Karwath | ...................... | 318/439 |
| 5,892,339 A | * | 4/1999 | Park et al. | ................... | 318/254 |
| 5,969,490 A | * | 10/1999 | Gotou | ........................ | 318/254 |
| 6,008,603 A | * | 12/1999 | Jones et al. | ................. | 318/254 |
| 6,285,146 B1 | * | 9/2001 | Harlan | ........................ | 318/254 |
| 6,570,357 B1 | * | 5/2003 | Gotou | ........................ | 318/599 |
| 6,828,748 B1 | * | 12/2004 | Horng et al. | ............... | 318/599 |

* cited by examiner

*Primary Examiner*—David Martin
*Assistant Examiner*—Erick Glass
(74) *Attorney, Agent, or Firm*—Pro-Techtor Int'l Services

(57) ABSTRACT

A constant-current driving method and a driving circuit for a DC motor are provided. A DC motor is often used for a DC fan. For a DC motor having two magnetic coils, the constant-current driving method is implemented by employing two control voltage signals to respectively control two semiconductor switches that are respectively connected to the two coils. One terminal of each coil is connected to a same high DC voltage, and one terminal of each semiconductor switch is connected to a same low DC voltage. The two semiconductor switches do not turn on at the same time. When each semiconductor switch is turned on, the current flowing through the coil connected to the switch eventually approaches and remains at a constant value. The constant-current driving method is especially suitable for producing low-rotation-speed and low-current DC motors.

6 Claims, 6 Drawing Sheets

METHOD AND CIRCUIT FOR DRIVING A DC MOTOR

BACKGROUND OF THE INVENTION

1. Field of Invention

The present invention relates to a DC motor. More particularly, the present invention relates to a constant-current driving method and circuit for driving a DC motor.

2. Description of Related Art

Traditionally, the use of a DC fan incorporating a DC brushless motor has been for scattering heat in various electronic products. This is because when heat accumulates within the products and cannot be dispersed, components of the products cannot function and operate well, and the whole system may even fail or be permanently damaged. Therefore, a DC fan incorporating a DC brushless motor acts as a heat-scattering device to make various components in the system operate normally in a better temperature environment. Due to different factors including heat scattering, high rotation speed has been preferred in the design of a DC motor.

Moreover, different fields of application and required qualities of the electronic product make two other design requirements for a DC motor gradually more important. One of the two requirements is low noise, and the other is low power operation. Low power operation means low rotation speed and low current. A DC fan with low rotation speed and low current can be used in many applications, such as blowing an aromatic around or spreading moisture in a humidifier.

The traditional method for driving a DC motor of a fan is a constant-voltage-output or constant-voltage driving method. FIG. 1 illustrates a driving circuit, which includes two transistors and two rotatable armature windings of a DC motor. Transistors 102 and 106 are bipolar junction transistors (BJT), and their collector-to-emitter voltages Vce are Vce1 and Vce2, respectively, which are the voltages at the two output nodes DO and DOB in FIG. 1. The resistances R of the two armature windings 100 and 104 are R1 and R2, respectively, the supply voltage and total supply current are Vcc and Icc, respectively, and the currents I flowing through the two armature windings 100 and 104 are I1 and I2, respectively.

When the constant-voltage driving is used, the two transistors 102 and 106 are controlled by two control voltage signals V1 and V2 and do not turn on simultaneously. When each transistor is turned off, it enters the cutoff region, and the current I is very small and close to zero. Therefore, the voltage at the output node is approximately equal to Vcc. When each transistor is turned on, it may gradually enter and remain in the saturation region, in which the collector-to-emitter saturation voltage is $V_{ce1,sat}$ for the transistor 102 and is $V_{ce2,sat}$ for the transistor 106, both values of which are specified on the transistor data sheet. Because the output voltage Vce of a transistor is almost constant when remaining in the saturation region, the driving method is called constant-voltage-output driving. At this moment, $$Vcc = V_{ce1,sat} + I1R1$$
$$= V_{ce2,sat} + I2R2,$$

in which R1 and R2 are constant and determined by the two armature windings 100 and 104. When Vcc is varied over a substantial range (0 to 12V), the two saturation voltages $V_{ce1,sat}$ and $V_{ce2,sat}$ vary over a small range (0.3 to 0.6V), and the currents I1 and I2 vary over a relatively large range (0 mA to the maximum allowed current value). Even 1.5 to 2 times of the original current value can occur when the transistor is locked in the saturation region. Therefore, the constant-voltage driving is suitable for manufacturing high-rotation-speed and high-current fans.

If the DC fan can be started at or above a certain driving current (current through the winding), this driving current level is called the starting current, and the magnitude of Vcc required for achieving the starting current is called the starting voltage. Since the currents I1 and I2 are inversely proportional to the resistances R1 and R2, respectively, the constant-voltage driving requires a relatively large resistance R to limit the current value if a fan with a low current and low rotation speed is to be developed. When the resistance R is large, the starting voltage required for achieving the starting current becomes large. Therefore, when the constant-voltage driving is used, the resistance R affects the starting voltage, and that means the starting voltage is more sensitive to manufacturing differences causing different values of the resistance R. In addition, since high resistance current-limiting windings are not easy to produce, impedance or resistance matching of the windings is difficult for a low-rotation-speed fan. Furthermore, the rotation speed is often not consistent between batches of low-rotation-speed fans produced, that is, the rotation speed is not stable and is poorly controlled.

For the foregoing reasons, the constant-voltage driving method is not suitable for making low-current and low-rotation-speed fans, and there is a need for a better driving method.

SUMMARY OF THE INVENTION

According to the shortcomings of using the constant-voltage driving to drive a DC motor described above, which especially happen in low-current and low-rotation-speed fans, an objective of the present invention is to provide a constant-current driving method and circuit for eliminating the shortcomings and improving the qualities of low-current and low-rotation-speed fans.

For a DC motor having two magnetic coils, the constant-current driving method is performed as described below. Two control voltage signals are used to control two semiconductor switches of a driving circuit connected to the two magnetic coils, respectively. When each of the two semiconductor switches is turned on, the current flowing through the magnetic coil connected to the semiconductor switch that is turned on approaches and remains at a constant value. A terminal of each of the two magnetic coils is connected to a high reference potential line, and a terminal of each of the two semiconductor switches is connected to a low reference potential line. Because the current flowing through the magnetic coil approximately remains constant, the method is called a constant-current driving method. With respect to a low-current fan, since the constant-voltage driving is not used, the resistance R of the magnetic coil can be effectively reduced. In an embodiment of the present invention, the two semiconductor switches are realized by two bipolar junction transistors.

According to the constant-current driving method, the invention also presents a circuit for driving a DC motor. In addition to the two semiconductor switches, the driving circuit further includes a constant current source connected between a terminal of each of the two semiconductor switches and the low reference potential line. The two semiconductor switches are connected to the low reference potential line through the constant current source. When in operation, the constant current source provides a constant current, and the two semiconductor switches are turned on alternately and not simultaneously, so that at every moment this constant current flows through one of the two semiconductor switches. In an embodiment, the constant current source is realized by a third semiconductor switch.

It is to be understood that both the foregoing general description and the following detailed description are by examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

The present invention provides a constant-current driving method and circuit for driving a DC motor that solve the problems resulting from using the constant-voltage driving method and therefore improve the quality of low-current and low-rotation-speed fans incorporating the motor.

First Embodiment

Figure 2:
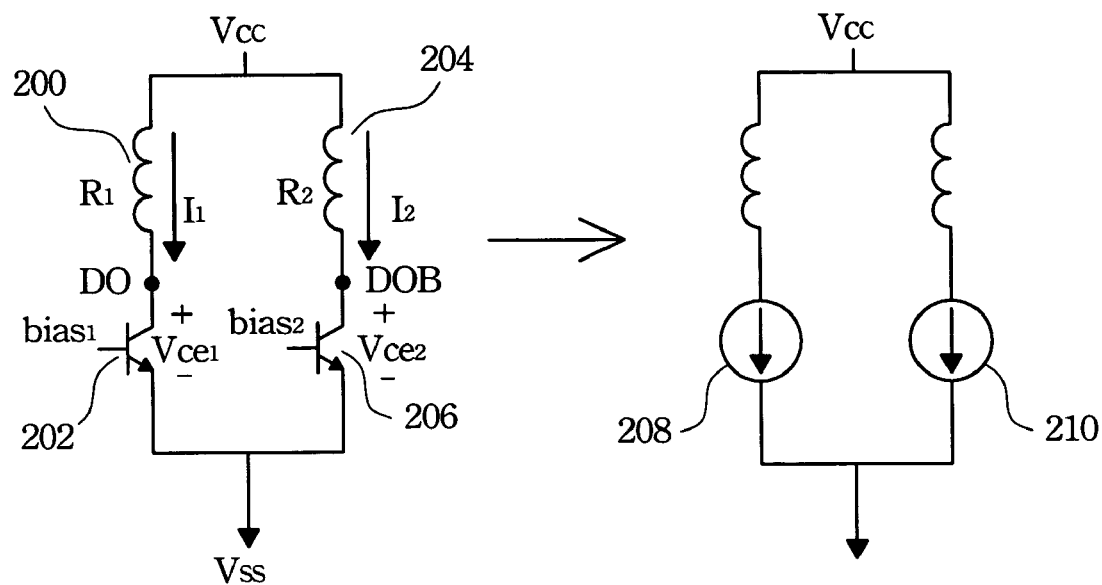
FIG. 2 illustrates two magnetic coils and a driving circuit including two transistors of a DC motor and an equivalent circuit according to an embodiment of the invention.

FIG. 2 illustrates two magnetic coils and a driving circuit of a DC motor and an equivalent circuit according to an embodiment of the invention. The DC motor has two magnetic coils 200 and 204 receiving and driven by currents for the purpose of rotation. A terminal of each of the magnetic coils 200 and 204 is connected to a high reference voltage Vcc, and the other terminal is connected to a semiconductor switch. In this embodiment, the two semiconductor switches are two bipolar junction transistors (BJT) 202 and 206. A terminal of each of the two bipolar junction transistors 202 and 206 is connected to ground with a voltage denoted as Vss. A constant current through each of the two bipolar junction transistors 202 and 206 is generated for driving the magnetic coils 200 and 204 by applying control voltage signals bias1 and bias2 to the control terminals of the two transistors, respectively.

The control voltage signals bias1 and bias2 are set as described below. A semiconductor switch such as a bipolar junction transistor has a feature that its output current is controlled by the control voltage. Depending on the control voltage and voltages at the other two terminals, a semiconductor switch can enter different operation regions. Taking a BJT as an example, three operation regions exist that include the cutoff region, the active region, and the saturation region. When in the active region, a BJT outputs substantially constant current. In this embodiment, control voltage signals bias1 and bias2 are set according to the specification of the BJT to make the two transistors 202 and 206 operate in the active region. Also, the control voltage signals bias1 and bias2 alternately and do not simultaneously enable the two transistors 202 and 206, so as to exert a constant current alternately through the magnetic coils 200 and 204 for rotating the vanes and other structures of the motor. The waveforms of the control voltage signals bias1 and bias2 may be rectangular wave clock signals.

The two transistors 202 and 206 do not turn on simultaneously. When the transistor 202 is turned on, it is in the active region, and the current I1 flowing through the magnetic coil 200 approaches and remains at a constant value. Similarly, when the transistor 206 is turned on and in the active region, the current I2 flowing through the magnetic coil 204 also approaches and remains at a constant value. The active region of operation is realized by adjusting the control voltage signals bias1 and bias2. When locked in the active region, $$Vcc = Vce1 + I1R1$$
$$= Vce2 + I2R2$$

where the currents I1 and I2 are essentially constant and can be determined according to the design specification, R1 and R2 are the resistances of the magnetic coils 200 and 204, respectively, and Vce1 and Vce2 are the collector-to-emitter voltages of the two transistors 202 and 206, respectively, which are the voltages at the two output terminals DO and DOB. Vce1 and Vce2 vary with Vcc.

With respect to the equivalent circuit on the right-hand side of FIG. 2, the two transistors 202 and 206 emulate constant current sources 208 and 210, respectively. Each constant current source provides current only when the corresponding transistor is turned on. When the transistor 202 or the transistor 206 is turned off, the current I1 or I2 is close to zero, and therefore the voltage at the output terminal DO or DOB is close to Vcc, and the current of the corresponding current source in the equivalent circuit is close to zero.

Second Embodiment

Figure 3:
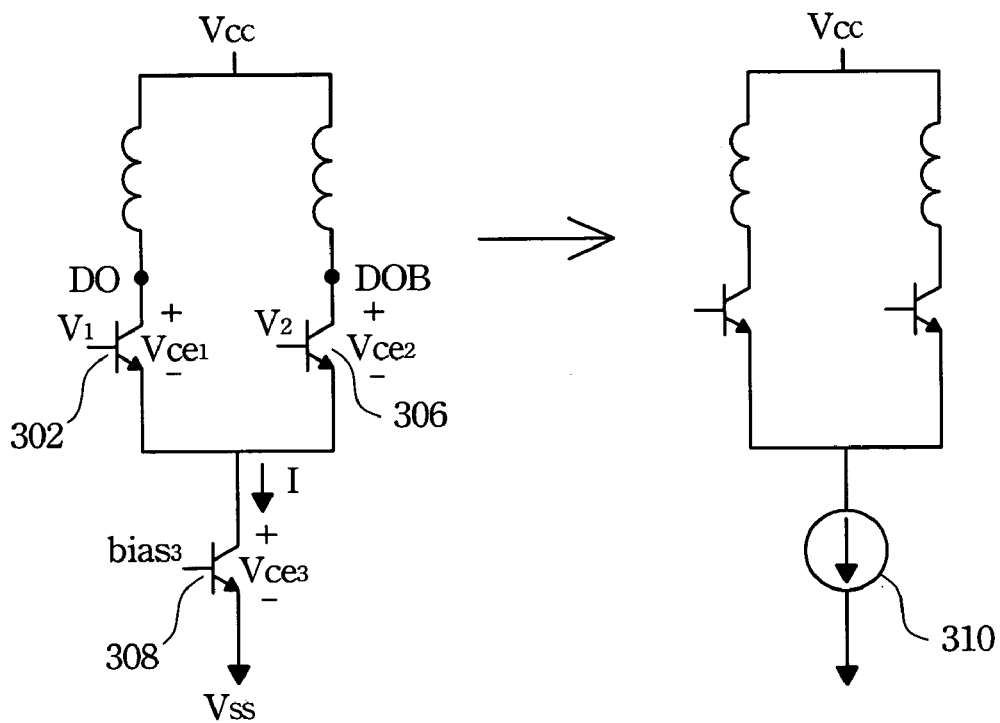
FIG. 3 illustrates two magnetic coils and a driving circuit including three transistors of a DC motor and an equivalent circuit according to a second embodiment of the invention.

FIG. 3 illustrates two magnetic coils and a driving circuit of a DC motor and an equivalent circuit according to a second embodiment of the invention. A terminal of each of two semiconductor switches, such as the bipolar junction transistors 302 and 306, is connected to a terminal of another semiconductor switch, such as the bipolar junction transistor 308. A low reference potential Vss is applied to another terminal of the transistor 308.

Two control voltage signals V1 and V2 control the turning on and off of the two transistors 302 and 306 and do not simultaneously turn them on. A control voltage signal bias3 controls the transistor 308. When the transistor 308 is turned on, it is in the active region (this can be realized by adjusting the control voltage signal bias3), and the current I flowing through its collector approaches and remains at a constant value. During the time the transistor 308 is turned on, when either one of the transistors 302 and 306 is turned on, the constant current provided by the transistor 308 flows almost entirely through the transistor turned on and this transistor operates in the saturation region. When either one of the transistors 302 and 306 is turned on and in the saturation region, its collector-to-emitter voltage approaches the saturation value ($V_{ce1,sat}$ or $V_{ce2,sat}$) and varies very little. The collector-to-emitter voltage Vce3 of the transistor 308 varies with Vcc, and therefore, the voltage at the output terminal (DO or DOB) also varies with Vcc. With reference to the equivalent circuit on the right-hand side of FIG. 3, the transistor 308 is equivalent to a constant current source 310. The constant current source 310 may be realized by a current source other than the transistor 308.

Third Embodiment

In another aspect, the detection of the rotation speed of the DC motor by, for example, a computer, is often necessary in the operation of the motor, and the detected rotation speed is then used to implement certain correction procedures, so as to achieve an accurate specified rotation speed. To detect the rotation speed, a frequency detection signal FG is generated and provided to the computer for processing. In constant-voltage or constant-current driving ICs, the way of generating the frequency detection signal FG is normally by connecting the output terminal (DO or DOB) of the transistor 202 or 206 in FIG. 2 directly to the base terminal (through a resistance) of an external transistor, connecting the collector terminal of the external transistor to a high reference potential line through a resistance, and connecting the emitter terminal of the external transistor to a low reference potential line. The output voltage at the collector terminal of the external transistor is thus the frequency detection signal FG. The principle of generating the frequency detection signal FG is to apply the alternating voltage at the output terminal (DO or DOB) to the base terminal of the external transistor for controlling the turning on and off of the external transistor, so as to generate an alternating frequency detection signal FG that is the collector output voltage of the external transistor. The frequency detection signal FG can therefore reflect the rotation speed. When the voltage at the output terminal (DO or DOB) is at the low voltage level, this low level must be able to turn off the external transistor so that the frequency detection signal FG is at a high voltage level.

Figure 7:
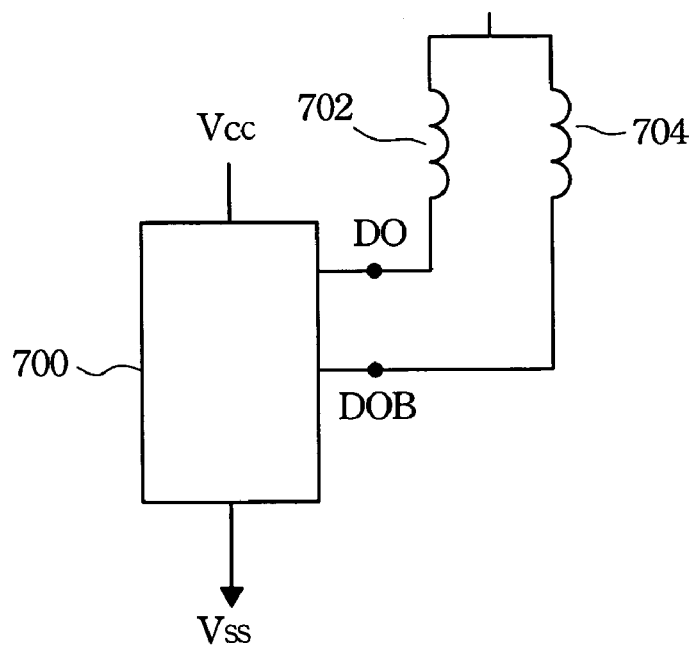
FIG. 7 illustrates a normal integrated circuit chip with four pins for driving two magnetic coils of a DC motor.

FIG. 7 illustrates a normal integrated circuit chip 700 with four pins for driving two magnetic coils of a DC motor. The driving IC chip 700 can employ constant-voltage driving or constant-current driving. The four pins include two output terminals DO and DOB for connecting to the two magnetic coils 702 and 704, a terminal for receiving a supply voltage Vcc, and a terminal for receiving a low reference voltage Vss. However, when constant-current driving is used, the collector-to-emitter voltage Vce of each of the two transistors within the IC chip 700 (connecting to the magnetic coils 702 and 704 through the output terminals DO and DOB) when turned on, that is, the voltage at the output terminal (DO or DOB) when the emitter voltage of each transistor is zero, varies and is higher than the saturation value $V_{ce,sat}$. In this instance, if the output terminal (DO or DOB) is directly connected to the base terminal of an external transistor, the collector-to-emitter voltage Vce of the transistor within the IC chip 700 having this output terminal, when turned on, may be so high that it still turns on the external transistor, causing the frequency detection signal FG to be at a low voltage level. It is noted that when this transistor within the IC chip 700 is turned on, the external transistor should be turned off, and the frequency detection signal FG should be at a high voltage level. Accordingly, when constant-current driving is used, it is not appropriate to connect the output terminal (DO or DOB) directly to the base terminal of an external transistor for generating the frequency detection signal FG.

Figure 8:
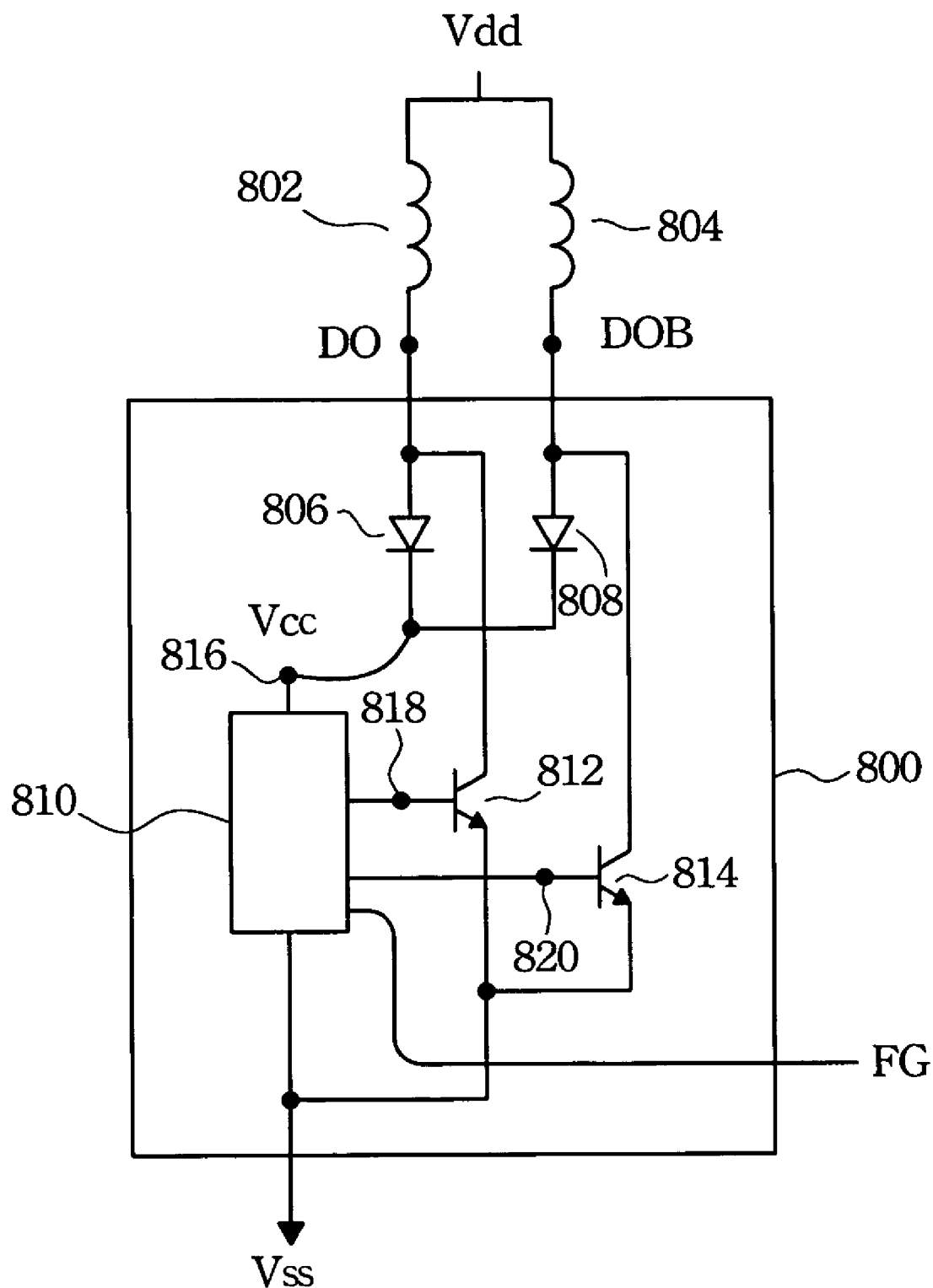
FIG. 8 illustrates an integrated circuit chip with four pins for driving two magnetic coils of a DC motor according to an embodiment of the invention.

A type of integrated circuit chip employing the constant-current driving method of the invention can overcome the shortcomings of the manner of generating the frequency detection signal FG described above. FIG. 8 illustrates an integrated circuit chip with four pins for driving two magnetic coils of a DC motor according to an embodiment of the invention. The driving IC chip 800 is for driving a DC motor having magnetic coils 802 and 804. In this embodiment, the driving IC chip 800 is made in a single-in-line package (SIP) form with four pins, and it has two semiconductor switches such as two transistors 812 and 814, two diodes 806 and 808, and a driving circuit 810. The four pins include first and second chip output terminals DO and DOB for connecting to the magnetic coils 802 and 804, a third chip output terminal for receiving a frequency detection signal FG for detecting the rotation speed of the DC motor, and a fourth chip output terminal for receiving a low reference potential Vss. A terminal of each of the two transistors 812 and 814 connects to the first and second chip output terminals DO and DOB, respectively, and the other terminal of each of the two transistors 812 and 814 connects to the fourth chip output terminal for receiving the low reference potential Vss. A terminal of each of the two diodes 806 and 808 also connects to the first and second chip output terminals DO and DOB, respectively, and the other terminal of each of the two diodes 806 and 808 connects to an input terminal 816 of the driving circuit 810. The driving circuit 810 has a terminal connecting to the fourth chip output terminal for receiving the low reference potential Vss, and two other terminals 818 and 820 connecting to the two transistors 812 and 814, respectively. When the driving IC chip 800 is used to drive the DC motor, a terminal of each of the two magnetic coils 802 and 804 receives a high reference potential Vdd, the fourth chip output terminal receives the low reference potential Vss, and the driving circuit 810 provides two control voltage signals through the two terminals 818 and 820 to control the two transistors 812 and 814, respectively. The two control voltage signals do not simultaneously turn on the two transistors 812 and 814. At every moment the high reference potential Vdd is substantially conveyed to the input terminal 816 of the driving circuit 810 through the diode 806 or 808 to be a supply voltage Vcc of the driving circuit 810 and possible other circuits within the driving IC chip 800. The driving circuit 810 also provides the frequency detection signal FG received by the third chip output terminal. The frequency detection signal FG reflects the frequency of one or the other of the two control voltage signals.

This way of generating the frequency detection signal FG can avoid the shortcomings described above, because the frequency detection signal FG is no longer generated from the first or second chip output terminal DO or DOB. Moreover, the specification of the pins of the driving IC chip 800 does not include a pin required to receive a supply voltage Vcc of the internal circuits of the driving IC chip 800.

Analysis of Driving the Motor using the Constant-Current Driving Method

Figure 4:
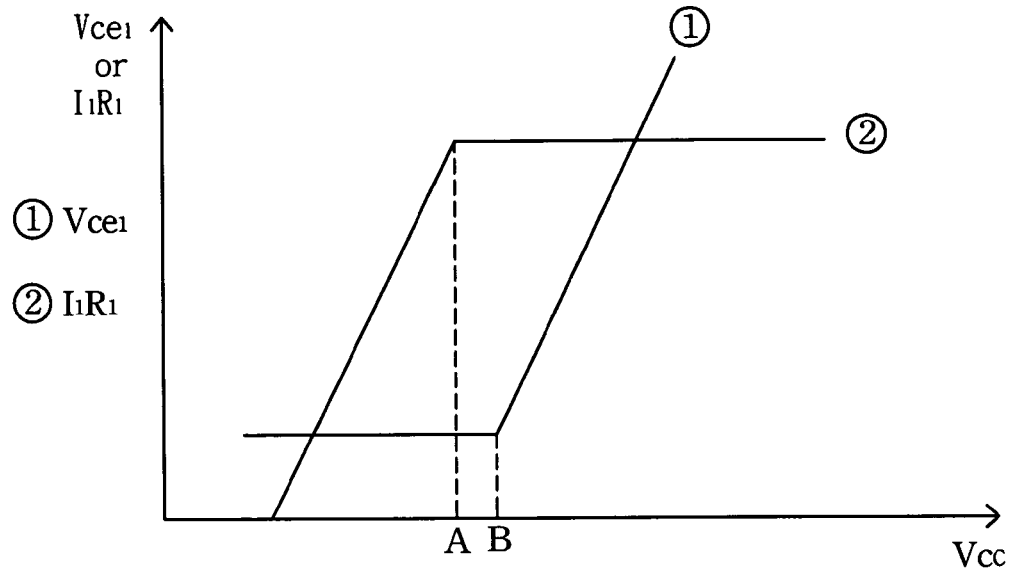
FIG. 4 illustrates under the constant-current driving the approximate variations of the collector-to-emitter voltage of the transistor 202 in FIG. 2 when turned on with the high supply voltage of the magnetic coil 200, and the approximate variations of the product of the current through the coil 200 and the coil resistance with the high supply voltage of the coil 200.

FIG. 4 illustrates, under the constant-current driving, the approximate variations of the collector-to-emitter voltage Vce1 of the transistor 202 in FIG. 2 when turned on with the high supply voltage Vcc of the magnetic coil 200, and the approximate variations of the product I1R1 of the current I1 through the coil 200 and the coil resistance R1 with the high supply voltage Vcc of the coil 200. Curve (1) represents the result of Vce1 varying with Vcc, and curve (2) represents the result of I1R1 varying with Vcc. With respect to curve (2), when Vcc is less than A, the current I1 has not reached the constant current value through the transistor 202 when locked in the active region. When Vcc is larger than A, the current I1 has reached and remains at the constant current value. This constant current value can be designed to be a low current value required for a low-current fan. With respect to curve (1), when Vcc exceeds B, Vce1 almost linearly increases as Vcc increases.

Figure 5:
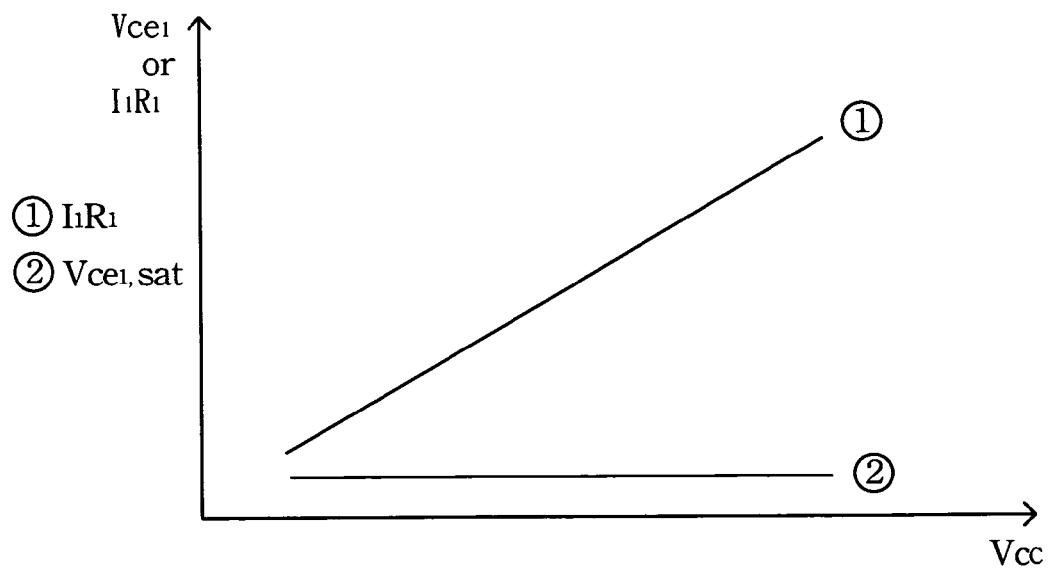
FIG. 5 is that of FIG. 4 except that the constant-voltage driving is used.

When the constant-voltage driving is used, FIG. 4 is replaced by FIG. 5. In FIG. 5, curve (1) represents the result of I1R1 varying with Vcc, and curve (2) represents the result of Vce1 varying with Vcc. Since the transistor 202 is in the saturation region, Vce1 remains at the low saturation value $V_{ce1,sat}$ almost along the entire curve (2) and is approximately a constant voltage. As Vcc increases, curve (1) indicates that I1 almost linearly increases (since R1 is constant). Since I1 can reach a high current value, the constant-voltage driving is suitable for a high-rotation-speed and high-current fan.

Figure 6:
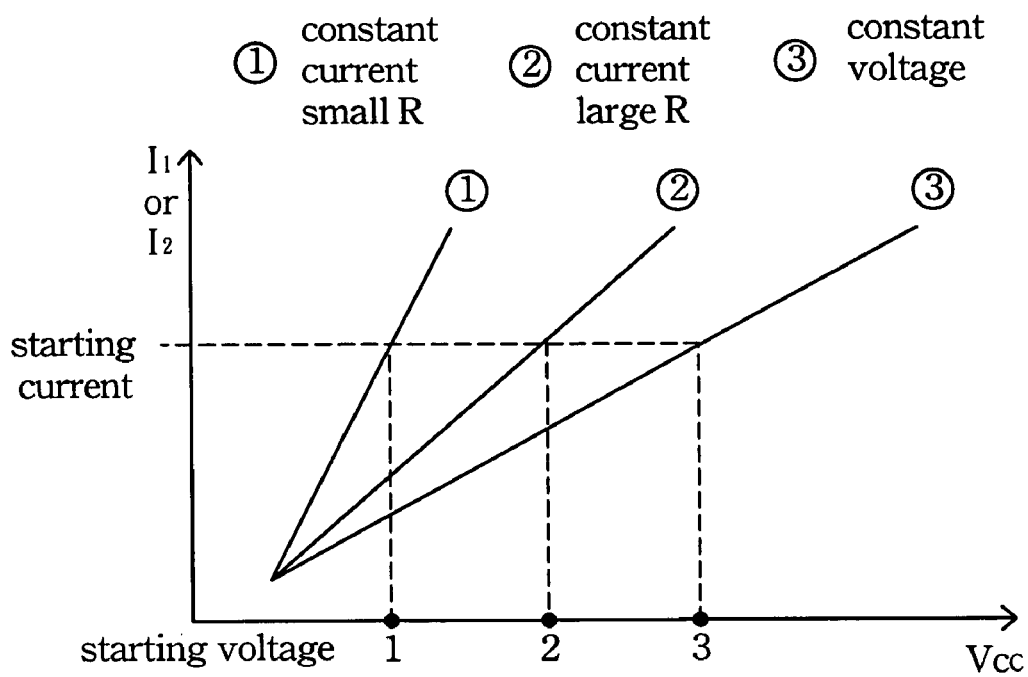
FIG. 6 illustrates the approximately linear variations of the current flowing through the magnetic coil 200 or 204 in FIG. 2 with the high supply voltage of the magnetic coil 200 or 204 under three different circumstances when the constant-voltage driving or the constant-current driving is used.

Analysis of the starting voltage is described below. As previously described above, if the DC fan can be started at or above a certain driving current, this driving current level is called the starting current, and the magnitude of Vcc required for achieving the starting current is called the starting voltage. FIG. 6 illustrates a comparison of required starting voltage values of Vcc for three different circumstances when the constant-voltage driving or the constant-current driving is used, such that a starting current value of the current I (I1 or I2) through the magnetic coil 200 or 204 in FIG. 2 is achieved. Line (1) represents the circumstance of when the constant-current driving is used and the coil resistance R is small, wherein the starting voltage value of Vcc is denoted by the number 1. Line (2) represents the circumstance of when the constant-current driving is used and the coil resistance R is large, wherein the starting voltage value of Vcc is denoted by the number 2. Line (3) represents the circumstance of when the constant-voltage driving is used and the coil resistance R is even larger (for limiting the current), wherein the starting voltage value of Vcc is denoted by the number 3. As shown in FIG. 6, the required starting voltage value denoted by 3 is larger than the required starting voltage value denoted by 2, which is larger than the required starting voltage value denoted by 1. This is because the coil resistance R is inversely proportional to the slope (ΔI/ΔVcc) of the three lines (1), (2), and (3). Therefore, when the coil resistance R is small, a small increase in Vcc causes a large increase in the current I. For a fan with low current, when the constant-current driving is used, a small coil resistance R can be used (since a large coil resistance R is not needed to limit the current), and therefore, the required starting voltage for a specific starting current to be achieved is small.

With respect to the starting voltage of a fan with low rotation speed and low current, a numerical example follows. A driving IC employing the constant-current driving is named A222, and the Vce (Vce1 or Vce2) when the current is at the starting current level is 2.0V. The starting voltage is calculated as follows.

starting voltage=(starting current*coil resistance)+ 2.0V (if less than 3.5V, the value of 3.5V is used)

Another driving IC employing the constant-voltage driving is named A276, and the saturation value $V_{ce,sat}$ ($V_{ce1,sat}$ or $V_{ce2,sat}$) is assumed to be negligible. The starting voltage is calculated as follows.

starting voltage=starting current*coil resistance

Supposing that a low-rotation-speed and low-current fan is to be produced, wherein the maximum value of Vcc is 12V, the rotation speed is 2000 rpm, the value of the current I when the transistor is locked in a target operation region is 40 mA, and the starting current is 30 mA. If the driving IC A222 is used, a coil resistance R of only 30Ω can be used and the fan can be started at a voltage Vcc of about 3.5V (since 30Ω*30 mA is less than 3.5V). If a coil resistance R of 80Ω is used, the starting voltage is about (80Ω*30 mA)+2.0V=4.4V If the driving IC A276 is used and the requirements of having low current and low rotation speed is to be achieved, the coil resistance R has to be increased to 300Ω, and the starting voltage is consequently increased to 30 mA*300Ω=9V.

In respect of the power dissipation (PD), an analysis follows. Since Vce increases as Vcc increases under the constant-current driving, limitations of heat dissipation (power dissipation) of an IC package must be considered. The load of heat in an IC can be reduced by adjusting the coil resistance R and reducing Vce. For example, the PD of a driving IC A222 at 70° C. is to be maintained at 480 mW, Vcc is equal to 12V, the current I (at every moment, only one of the two magnetic coils has this current since the two transistors do not turn on at the same time) through a magnetic coil when the transistor is locked in the active region is 40 mA, and the internal total supplied current Icc in the IC is 10 mA. The calculation is as follows.

$PD=Vce*I+Vcc*Icc=Vce*40$ mA+12V*10 mA=480 mW=>Vce=9V voltage across the coil $V_R=Vcc-Vce=12-9=3V$ and $V_R=I*R=40$ mA*R=3V=>R=75Ω

Therefore, a coil resistance R of 75Ω should be used, and Vce is equal to 9V when the transistor is locked in the active region. If the current I through a magnetic coil when the transistor is locked in the active region is 80 mA, the calculation is as follows.

$$PD=Vce*I+Vcc*Icc=Vce*80\ mA+12V*10\ mA=480$$

$$mW=>Vce=4.5V$$

$$\text{voltage across the coil } V_R=Vcc-Vce-Vce=12-4.5=7.5V$$

$$\text{and } V_R=I*R=80\ mA*R=7.5V=>R=93.75\Omega$$

Therefore, a coil resistance R of 93.75Ω should be used, and Vce is equal to 4.5V when the transistor is locked in the active region. The value of Vce when the transistor is locked in the active region must be within the allowable range specified in the specification of the IC.

Figure 1:
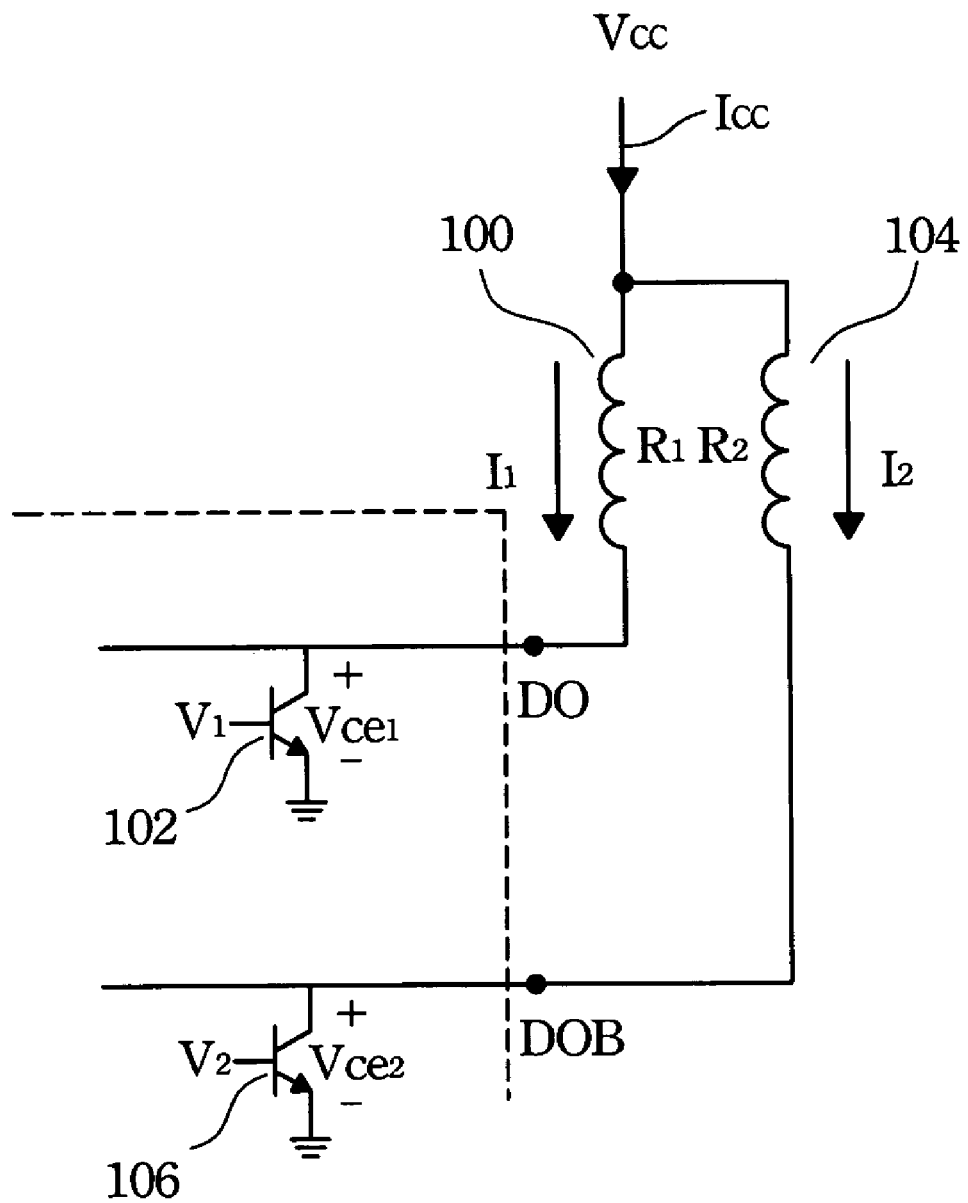
FIG. 1 illustrates two rotatable armature windings and a driving circuit including two transistors of a DC motor.
Figure 9:
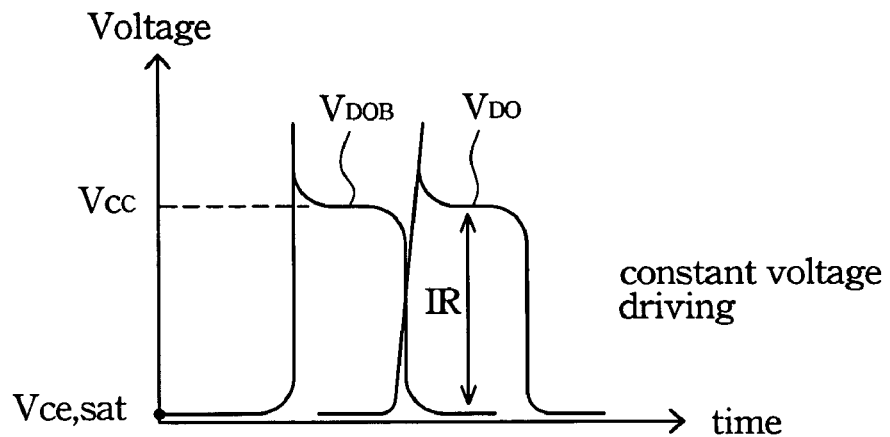
FIG. 9 illustrates partial variations of the voltages ($V_{DO}$ and $V_{DOB}$) at the output terminals (DO and DOB) of the driving circuit in FIG. 1 with time under the constant-voltage driving.

FIG. 9 illustrates partial variations of the voltages $V_{DO}$ and $V_{DOB}$ at the output terminals DO and DOB of the driving circuit in FIG. 1 with time under the constant-voltage driving. As shown in FIG. 9, $V_{DO}$ and $V_{DOB}$ alternately rise to be Vcc supplied to the two magnetic coils 100 and 104 of FIG. 1, since the two transistors 102 and 106 do not turn on simultaneously. When $V_{DO}$ is at the high supply voltage Vcc (the transistor 102 is turned off) and the transistor 106 is turned on and in the saturation region, the Vce of the transistor 106, the $V_{DOB}$, is equal to the saturation value $V_{ce,sat}$. The difference between Vcc and $V_{ce,sat}$ is the product of the current I (I1 or I2) flowing through the magnetic coil 100 or 104 and the coil resistance R (R1 or R2).

Figure 10:
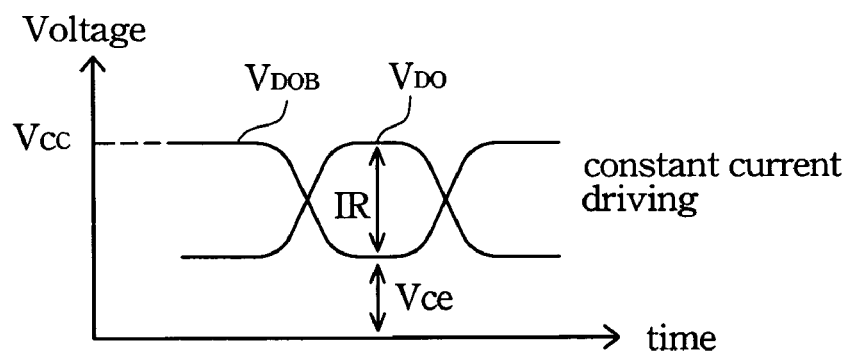
FIG. 10 illustrates partial variations of the voltages ($V_{DO}$ and $V_{DOB}$) at the output terminals (DO and DOB) of the driving circuit in FIG. 2 with time under the constant-current driving.

FIG. 10 illustrates partial variations of the voltages $V_{DO}$ and $V_{DOB}$ at the output terminals DO and DOB of the driving circuit in FIG. 2 with time under the constant-current driving. As shown in FIG. 10, $V_{DO}$ and $V_{DOB}$ alternately rise to be Vcc supplied to the two magnetic coils 200 and 204 of FIG. 2 since the two transistors 202 and 206 do not turn on simultaneously. When $V_{DO}$ is at the high supply voltage Vcc (the transistor 202 is turned off) and the transistor 206 is turned on and in the active region, the $V_{DOB}$ is equal to the Vce of the transistor 206. The difference between Vcc and Vce is the product of the current I (I1 or I2) flowing through the magnetic coil 200 or 204 and the coil resistance R (R1 or R2).

Figure 11:
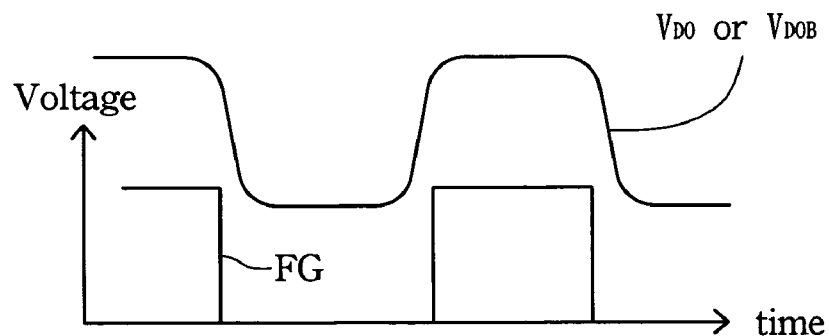
FIG. 11 illustrates a partial variation of the voltage ($V_{DO}$ and $V_{DOB}$) at the output terminal (DO or DOB) of the driving circuit in FIG. 2 with time under the constant-current driving against a synchronous partial variation of the frequency detection signal for detecting the rotation speed of the DC motor.

FIG. 11 illustrates a partial variation of the voltage $V_{DO}$ or $V_{DOB}$ at the output terminal DO or DOB of the driving circuit in FIG. 2 with time under the constant-current driving against a synchronous partial variation of the frequency detection signal FG for detecting the rotation speed of the DC motor. As shown in FIG. 11, the frequency detection signal FG is similar to a clock signal. When $V_{DO}$ or $V_{DOB}$ is at the high supply voltage Vcc, the frequency detection signal FG is also at a high voltage. When $V_{DO}$ or $V_{DOB}$ is at a low voltage level, the frequency detection signal FG is also at a low voltage level. Therefore, the switching frequency of $V_{DO}$ or $V_{DOB}$ can be known from the frequency of the frequency detection signal FG, and the rotation speed of the motor can thereby be determined.

Under the constant-current driving method, when Vcc is varied over a substantial range (0 to 12V), the voltage Vce varies over a large range (0.3 to 9V). In this instance, since the coil resistance is relatively small, the current I is about 1.2 to 2 times the original current value when the transistor is locked in the active region. Since the current I varies over a small range (0 mA to the rated current value), and the current I remains constant when the transistor is locked in the active region, the constant-current driving is suitable for manufacturing low-rotation-speed and low-current fans. In addition, since the current I does not change as the coil resistance R is changed, magnetic coils having low coil resistance R that are easy to produce can be employed, and impedance matching of the coils is easy for a low-rotation-speed fan. The stability of the rotation speed between batches of low-rotation-speed fans produced is also high.

Although the present invention has been described in considerable detail with reference to certain preferred embodiments thereof, other embodiments are possible. Therefore, their spirit and scope of the appended claims should not be limited to the description of the preferred embodiments contained herein.

What is claimed is:

1. A circuit for driving a DC motor, the DC motor having a first magnetic coil and a second magnetic coil, wherein the first magnetic coil has a first terminal and a second terminal, the second magnetic coil has a third terminal and a fourth terminal, and a high reference potential is applied to the first and third terminals, said circuit comprises:

a first semiconductor switch having a first control terminal, a first output terminal connected to said second terminal of the first magnetic coil, and a second output terminal, wherein said first semiconductor switch is a first bipolar junction transistor, said first control terminal, said first output terminal, and said second output terminal are the base terminal, the collector terminal, and the emitter terminal of said first bipolar junction transistor, respectively;

a second semiconductor switch having a second control terminal, a third output terminal connected to said fourth terminal of the second magnetic coil, and a fourth output terminal, wherein said second semiconductor switch is a second bipolar junction transistor, and said second control terminal, said third output terminal, and said fourth output terminal are the base terminal, the collector terminal, and the emitter terminal of said second bipolar junction transistor, respectively; and a constant current source providing an essentially constant current, said constant current source having a fifth terminal and a sixth terminal, said fifth terminal being connected to said second output terminal of said first semiconductor switch and to said fourth output terminal of said second semiconductor switch, a low reference potential being applied to said sixth terminal, said constant current source comprising a third bipolar junction transistor having a third control terminal, wherein said constant current source comprises a third bipolar junction transistor having a third control terminal, and said third control terminal receives a third control voltage signal, which makes said third bipolar junction transistor operate in the active regions;

wherein during operation, said first control terminal of said first semiconductor switch receives a first control voltage signal, said second control terminal of said second semiconductor switch receives a second control voltage signal, and said first control voltage signal and said second control voltage signal do not simultaneously turn on said first semiconductor switch and said semiconductor switch, respectively; and wherein, when said first control voltage turns on said first bipolar junction transistor, said first bipolar junction transistor is in the saturation region, and when said second control voltage signal turns on said second bipolar junction transistor, said second bipolar junction transistor is also in the saturation region, and the collector current of each of said first and second bipolar junction transistors in the saturation region is essentially equal to the value of said constant current.

2. The circuit of claim 1, wherein said third control terminal, said fifth terminal, and said sixth terminal are the base terminal, the collector terminal, and the emitter terminal of said third bipolar junction transistor, respectively.

3. An integrated circuit chip for driving a DC motor, the DC motor having a first magnetic coil and a second magnetic coil, wherein the first magnetic coil has a first terminal and a second terminal, the second magnetic coil has a third terminal and a fourth terminal, a high reference potential is applied to the first and third terminals, said integrated circuit comprises:
   a first chip output terminal connected to the second terminal of the first magnetic coil;
   a second chip output terminal connected to the fourth terminal of the second magnetic coil;
   a first semiconductor switch having a first control terminal receiving a first control voltage signal, a third output terminal connected to said first chip output terminal, and a fourth output terminal;
   a second semiconductor switch having a second control terminal receiving a second control voltage signal, a fifth output terminal connected to said second chip output terminal, and a sixth output terminal;
   a first diode having a fifth terminal and a sixth terminal, said fifth terminal being connected to said first chip output terminal;
   a second diode having a seventh terminal connected to said second chip output terminal and an eighth terminal connected to said sixth terminal;
   a driving circuit providing said first control voltage signal and said second control voltage signal and having a ninth terminal connected to said sixth terminal and having a tenth terminal;
   a third chip output terminal coupled to receive a frequency detection signal from said driving circuit for detecting the rotation speed of the DC motor, said frequency detection signal reflecting the frequency of said first control voltage signal or said second control voltage signal; and
   a fourth chip output terminal connected to said tenth terminal, said fourth output terminal, and said sixth output terminal, for receiving an external low reference potential.

4. The integrated circuit chip of claim 3, wherein said integrated circuit chip is made in a single-in-line package form with four pins, said four pins include said first chip output terminal, said second chip output terminal, said third chip output terminal, and said fourth chip output terminal, such that when said integrated circuit chip is used to drive the DC motor, said first control voltage signal and said second control voltage signal do not simultaneously turn on said first semiconductor switch and said second semiconductor switch, and at every moment, said high reference potential is substantially conveyed to said ninth terminal through said first diode or said second diode to be a supply voltage of said driving circuit.

5. The integrated circuit chip of claim 3, wherein said first semiconductor switch is a first bipolar junction transistor, said second semiconductor switch is a second bipolar junction transistor, such that when said first control voltage signal turns on said first bipolar junction transistor, said first bipolar junction transistor is in the active region, and when said second control voltage signal turns on said second bipolar junction transistor, said second bipolar junction transistor is also in the active region.

6. The integrated circuit chip of claim 5, wherein said first control terminal, said third output terminal, and said fourth output terminal are the base terminal, the collector terminal, and the emitter terminal of said first bipolar junction transistor, respectively, and said second control terminal, said fifth output terminal, and said sixth output terminal are the base terminal, the collector terminal, and the emitter terminal of said second bipolar junction transistor, respectively.

* * * * *